ANTON LEYKAUF, OF NÜRNBERG, BAVARIA.

Letters Patent No. 87,270, dated February 23, 1869.

IMPROVEMENT IN THE MANUFACTURE OF COLORS.

The Schedule referred to in these Letters Patent and making part of the same.

*To all whom it may concern:*

Be it known that I, ANTON LEYKAUF, of Nürnberg, in the Kingdom of Bavaria, have invented a new and useful Improvement in Colors, which I call Nürnberger Violet; and I do hereby declare the following to be a full, clear, and exact description thereof, which will enable those skilled in the art to make and use the same.

This invention relates to a violet or purple color, prepared from manganese-compounds, ammonia, or its salts, and phosphoric acid, or its compounds.

In preparing my color, I take binoxide of manganese, ($MnO_2$) as pure as possible, or some other cheap compounds of manganese, such as those obtained as a residuum in the manufacture of chlorine-gas, and mix the same with phosphoric acid, and heat in earthen or enamelled-iron vessels, until the product forms an even, violet, semi-liquid mass.

After cooling, the manganese is precipitated, by the addition of ammonia, or carbonate of ammonia, and the precipitate is then separated from the coarse portions of the binoxide of manganese remaining still undecomposed, and placed in a dish, together with the liquid.

The mixture is then evaporated and heated, until the bubbling up ceases in the violet mass, which at that time has become refractory.

In order to obtain the desired shade, it may be necessary to add a little phosphoric acid, or binoxide of manganese, or to increase the heat, which the operator will readily find out by experience.

If the mixture contains an insufficiency of phosphoric acid, the fusing of the mass, which essentially promotes the formation of the violet color, requires such a high temperature, that ammonia is driven out, and a white, vitreous compound ($3Mn\ OPO_3$) is deposited on those parts which are most exposed to the heat.

In the presence of a surplus of phosphoric acid, the mass fuses easy, but in this case it remains soluble in water, if the temperature is not raised high enough, or if the temperature is raised, a reddish vitreous product is obtained, which easily turns white.

In carrying out my invention on a large scale, I proceed as follows:

I first prepare a solution of acid phosphate of lime, by the decomposition of bones with sulphuric acid, and from this solution I obtain phosphate of ammonia, by precipitating with ammonia.

This solution I reduce to a salt by evaporation, and then heat the same, while carefully adding finely-pulverized binoxide of manganese, until this latter substance remains undecomposed in the fused mass, which at the beginning bubbles up violently, and which gradually assumes a beautiful violet color.

The temperature required changes, according to the hardness of the binoxide of manganese, from 150° up to 250° centigrade, but it is not advisable to use a still higher temperature, because, in that case, the above-named vitreous basic phosphate of manganese ($3Mn\ OPO_3$) is formed.

When soft binoxide of manganese is used, a quantity equal to one-half, by weight, of the phosphate of ammonia, is transformed into my violet color, but of hard kinds of binoxide of manganese, only one-third, by weight, of the salt is transformed, even if the temperature is raised to 350° centigrade.

According to the greater or less degree of perfection with which the lime is precipitated from the solution of the phosphate of lime, the color contains more or less of the lime, and its shade becomes darker or lighter.

Bones, sulphuric acid, and binoxide of manganese, well mixed together and heated, produce, by repeated washing, a solution, which, when evaporated, and heated with ammonia to about 210° centigrade, produces a mass fit for the violet color.

By using iron in various stages of oxidation, in combination with phosphoric acid and ammonia, a light-blue color is obtained, similar in its composition to the violet color above described. A modification can be effected, and a blue color produced, by the addition of oxide of iron.

It is needless to remark, and it will be readily understood by every chemist, that the same result can be obtained from various compounds of manganese, iron, ammonia, and phosphoric acid, and also directly from phosphorus, binoxide of manganese, ammonia, with or without the use of nitric acid, and also from a solution of burned bones and sulphate of ammonia in muriatic acid, and I therefore do not wish to confine myself to either of the above-named compounds.

What I claim as new, and desire to secure by Letters Patent, is—

A violet color, produced from manganese, ammonia, and phosphoric acid, substantially in the manner herein set forth.

Also, a color produced from manganese, iron, ammonia, and phosphoric acid, substantially in the manner specified.

In witness whereof, I have hereunto set my hand to the above specification of my said improvement in colors, this 9th day of December, 1868.

ANTON LEYKAUF.

Witnesses:
 OSCAR RUMMEL,
 PHILIP GEISS.